United States Patent [19]

Tartaglino

[11] Patent Number: 5,016,856
[45] Date of Patent: May 21, 1991

[54] INFLATABLE BLADDER FOR CONTROL OF FLUID FLOW

[76] Inventor: Jerry J. Tartaglino, 4911 W. Hanover, Dallas, Tex. 75209

[21] Appl. No.: 520,632

[22] Filed: May 8, 1990

[51] Int. Cl.⁵ .................................................. F16K 7/10
[52] U.S. Cl. ........................................ 251/61; 92/34; 137/907; 236/49.4
[58] Field of Search .................. 92/34; 236/49.4; 251/59, 61; 137/907

[56] References Cited

U.S. PATENT DOCUMENTS

| | | | |
|---|---|---|---|
| Re. 29,302 | 7/1977 | De Lepeleire | 251/61 X |
| 3,126,029 | 3/1964 | Englesson | 251/61 X |
| 3,465,814 | 9/1969 | Heck et al. | 236/49.4 X |
| 3,494,588 | 2/1970 | Kisling | 251/5 |
| 3,588,036 | 6/1971 | Harter | 251/61 |
| 4,006,754 | 2/1977 | Houston | 251/61 X |
| 4,040,564 | 8/1977 | Waeldner et al. | 236/49.4 |
| 4,186,876 | 2/1980 | Clark et al. | 236/49.4 |
| 4,506,830 | 3/1985 | Francel | 236/49.4 |
| 4,614,152 | 9/1986 | Fukasaku et al. | 281/61 X |
| 4,703,913 | 11/1987 | Hunkapiller | 251/61.1 |

Primary Examiner—Gerald A. Michalsky
Attorney, Agent, or Firm—Charles F. Schroedar

[57] ABSTRACT

An angularly shaped inflatable bladder assembly adaptable to use as a damper or shut-off means for control of fluid flow in fluid flow systems and more specifically for control of air flow in air conditioning systems. The angularly shaped bladder is formed of an assembly of fluid impermeable polymer sheet materials edge sealed. The bladder is bent to a desired angular form less than 180 degrees and at least one layer being flexible fluid conformable material without shape memory so that it responds to inflating fluid such as air pumped between the layers through a connection to the bladder. One or two inflatable pockets are provided upon bending the assembly along a line between two opposite edges of the bladder. Upon inflation the single or two pockets enlarge and push the opposite sides of the assembly further apart whereby the angle between the two becomes wider, or upon deflation the opposite sides are drawn together to narrow the angle. By mounting one side in fixed position as a base in a fluid channel while the other is allowed to be moveable as a gate when the pockets are inflated or deflate, a desired degree of restrictive throttling or shut off of fluid flow in the channel can be effected.

21 Claims, 4 Drawing Sheets

INFLATABLE BLADDER FOR CONTROL OF FLUID FLOW

FIELD OF THE INVENTION

The present invention is a fluid inflatable bladder which can be inserted in a fluid flow channel and inflated or deflated for control of the flow of fluid through the channel, such as a heating and cooling air conditioning duct, the bladder being adaptable to damping and shutting off the flow through the channel to a given zone. More specifically, the invention is a bladder-type damper device particularly adaptable to installation in heating and cooling air conditioning ducts or other fluid passages of a wide range of shapes and sizes to which it can be readily matched by custom trimming on site. The bladder is dimensionally practically self sustaining with a minimum need for support or need for changes in existing systems, further lending to its ready installation and use in limiting or blocking fluid flow through a channel.

The invention falls in the category of modern day advances in control of air flow in heating and air conditioning systems in which inflatable bladders can be used for zone temperature control systems wherein each zone or individual room is provided a temperature sensor such as a thermostat for sensing temperature and for sending a corresponding signal to regulate the flow of conditioned air to the zone as described in my U.S. Pat. Nos. 4,522,116, 4,662,269 and 4,783,045.

The commonly used prior art metal butterfly plates or vane dampers in heating and air conditioning systems are relatively difficult to install in existing and new air conditioning systems because of the need for drilling and installation of extra mechanisms, often complex, to permit adjustment of flow. Reconstruction of existing systems, or mechanical surgery of the existing systems, is usually entailed in installation of such prior art dampers, often with resulting leaks and accompanying loss of energy if not properly installed. Other problems are encountered in attempting to provide a damper design which will accommodate the wide range of duct sizes and shapes in both new and existing systems. Dampers of almost all such prior art designs require a special size for each different size of duct or passageway confronted.

In view of these problems it is a broad object of the present invention to provide an inflatable bladder adaptable to use for control of fluid flow in a channel which can adjustably respond to condition signals such as temperature signals and which can be installed in ducts and passageways of a wide range of sizes and shapes without need for special fabrication or reconstruction of the passageways.

It is another and more specific object of the invention to provide a bladder-type damper and shut-off means for heating and cooling air conditioning systems adaptable to use with a wide range of temperature and humidity controls in modern digital and time shared computer systems.

SUMMARY OF THE INVENTION

The invention is an improved bladder type damper or shut-off valve which can be operated by inflating the bladder with air or other fluid under pressure to throttle or shut off the flow of fluid in a flow channel in which it is installed or correspondingly to modify or shut off flow by selectively allowing it to self deflate or deflating it by connection to a negative pressure source. The negative pressure systems of automotive vehicles such as intake manifold systems lend themselves particularly well to providing the desired negative pressure when the bladder is used in air conditioning systems or for control of fluid flow in other fluid systems of automotive vehicles.

In my prior U.S. Pat. No. 4,783,045 a bladder is disclosed arranged in cylindrical and in rectangular forms for insertion in wall-lining relation with correspondingly shaped fluid passageways from which expansion pockets expand inwardly in mated relation to reduce or shut off the flow of fluid through the passageways.

The present invention is based upon the recognition that an elongate bladder in bent condition, like a balloon, when blown up, will act to straighten itself into its most extended configuration. Thus in its deflated condition, it will remain flat until blown up, whereupon from its bent condition it will form inflatable pockets on opposite sides of the bend which will oppose each other to cause extension of the bladder under the influence of both internal and external inflation forces. The bladder as herein disclosed moves outwardly under continued inflation within the limit and space for which it is designed in which condition it is arranged to perform a function, such as closure or opening of an air flow path or provide a starting condition for deflation of the bladder to perform a similar such function.

The bent form of the bladder allows it to be readily mounted within a flow channel to be regulated by having one pocket side mounted in fixed relation in the channel while the remaining bladder portion on the other side of the bend is free to move in compliance the pocket portions on opposite sides of the bend to push against each other upon inflation or to pull at each other upon connection to a negative pressure source.

To assure that the entire bladder will inflate even though bent, which condition might possibly form a restriction at the bend region, an internal separating spacer is provided, at least in the bend region, to assure a free flow through the bladder without restriction. This arrangement also facilitates withdrawal of inflating fluid from throughout the bladder and corresponding contraction of the bladder toward a flattened bent or folded condition upon connection to a negative pressure source which action can also be utilized to perform a regulating function in a fluid flow channel in which it is installed. Upon application of negative pressure to the bladder and consequent withdrawal of inflating fluid therefrom, the bladder will contract within the space determined by the dimensional stability of its overall form and guiding elements incorporated in the assembly to bring the deflated bladder in the collapsed configuration desired.

More specifically the bladder assembly for control of fluid flow of the present invention is arranged to have in one cross section an angular form less than 180 degrees with a bending region or hinge portion between two opposite edges, with associated expandable and contractible pockets on opposite sides of the hinge portion. The expanding pockets function cooperatively to push in opposition to each other to broaden the angular form of the bladder assembly upon supply of inflation fluid thereto under positive pressure. The angle is reduced between the two sides upon withdrawal of fluid from the bladder by connection to a vacuum source or, more precisely, a negative pressure source.

In use, one side and its associated pocket region of the bladder is fixed in mounted relation within the fluid passageway, whereby a base is provided about which the other side and remaining pocket portion of the bladder is moveable. The moveable portion of the bladder herein termed a blade or gate, is caused to move by application of pressure to the bladder by way of a connection to a supply of control fluid under positive pressure or by evacuation of fluid from the bladder by connection to a negative pressure source. The moveable portion of the bladder is sized and shaped to match the cross section of the passageway and is moved to positions for desired reduction or increased flow of fluid through the region of the passageway with which it is matched. Thus upon supply of inflating control fluid to the bladder, or withdrawal of inflating fluid therefrom, the main flow in the passageway in which fluid flow is to be controlled can be effected by expansion or contraction of the bladder, or both, in sequence as desired.

In a preferred form of the invention a bladder is made of a base layer of semi-flexible fluid-impermeable material which can be flexed under stress. The base layer is assembled with an over layer of fluid impermeable, fluid conformable material sealed to the base layer at the marginal edges of the bladder. The bladder assembly is divided into two opposite pocket portions by bending the assembly about a fold or hinge region located between two edges of the assembly.

A thin separator of flexible porous material, such as a layer of open screening material, can be provided as a spacer within the bladder positioned in traversing relation with the hinge region to assure an open non-pinched interior path for fluid flow across the hinge region. Thus the expansion fluid within the bladder can flow freely between the connected expandable pockets on opposite sides of the hinge region to move one or the other of the pocket portions of the bladder accurately about the hinge region when the other is fixed in position.

In this regard, the moveable fold-over portion, acts somewhat like the armature of an electrical relay and can be arranged to function as such in opening and closing a fluid flow circuit. The movable portion can accordingly be moved into mated relation with an opening in a passageway to effect a closure or opening thereof by corresponding supply or release of fluid to and from the interior of the bladder respectively, through the fluid connection means. If desired, a separate release outlet means can be associated with the base for separate control by release of the inflating fluid as desired. The bladder assembly shown however has a functional capability beyond the ordinary electrical relay in that the movable portion rather than being moveable by expansion or contraction to only one other position from its normal, can be moved progressively to any number of positions between its normal and the fully extended position.

The moveable portion of the preferred semi-flexible base material of the bladder is shaped to match the cross-sectional shape of the fluid passageway with which it is associated so that it can be moved to close off the flow of fluid through the passage, or be moved to an open position to allow free flow through the passageway. In this regard the moveable gate-like portion or blade of the bladder can be made more rigid than the remainder of the bladder by appropriate selection of material or by being made thicker and correspondingly stiffer. By extending the base beyond the bladder region, it can be folded over and integrated to provide a blade of still greater stiffness because of its double thickness which is matched in shape to the cross-sectional shape of the passageway. The passageway may be provided an added seal in the form of an internal frame defining an orifice within the passageway against which the blade can be closed to block continued flow of fluid therethrough. In addition or alternately, the edge of the blade can be provided with a marginal band of flexible material which will when moved to a closed position snugly accommodate the sides of the passageway to provide the desired positive closed relationship therewith.

The bladder assembly can be made self deflating by provision of the semi-flexible base which in conjunction with the fluid conformable overlayer is under stress when inflated, causing it to squeeze the inflating fluid to effect its removal when the bladder is opened to the atmosphere through the inflating connection. Correspondingly, upon release of the inflation fluid, the position of the damper blade on the moving pocket portion of the bladder is returned to its normal set position.

Alternately where the bladder assembly is positioned in its normal set angular relation and the angle of incline of the blade portion to the base is desired to be reduced, the assembly is connected to a source of negative pressure to withdraw fluid from the bladder interior which with the assemblies described herein results in a reduction in the angular relation between the movable and base portions of the assembly. Upon disconnection from the negative pressure source, air reenters the bladder under the force of the blade acting to return to its normal angular relation with the base of the assembly. In some instances it is desired to increase the angular relation between the blade and base portions from normal and then to reduce the angle from normal to provide a full range of control positions by selective supply of positive and negative pressures to the assembly.

The material of the base of the bladder is desirably such that it can be bent and set at a angle permitting one portion to be fixed in position, while the remaining portion is allowed to be moveable from the set angular position as hereinafter described in greater detail with reference to the drawings.

In addition it is often desirable that the base material be such that it allows trimming for size, thus permitting the given bladder to be cut marginally to the shape and dimension of the passageway in which it is to be installed. In this way one bladder assembly of large enough area dimension can be made to fit any of a number of sizes of passageways in which it is to be installed. By way of example "Hytrel", a polyester elastomer about 40–60 mils thick produced by DuPont Corporation is found capable of providing the stiffness properties desired for the blade portion. A "Hytrel" layer such as about 5–10 mils thick is found capable of providing the properties desired for the more flexible fluid conformable material which can be sealed with dielectric energy to the stiffer base material. The bladder assembly thus can be made of given size which can be cut to smaller desired dimensions matched to any of a wide range of passageways in new or retrofitted existing systems. In this regard the bladder can be made to fit and be operable in domestic, commercial and industrial heating and cooling air conditioning systems, and in automotive and other transportation heating and cooling air conditioning systems as well as in other fluid flow systems.

The means on the interior of the bladder providing assurance of a free flow of air between the opposing pocket portions on the opposite sides of the hinge region can be, as indicated above, a spacing screen material or other means extending only a short distance on both sides of the bend, but if desired can be arranged to extend across for the full dimension of the bladder. An alternate spacing or separator arrangement for assurance of such free flow is to provide separating embossments on one or both or the opposing interior surfaces of the bladder, at least in the bend region, or strips or ridges can be provided extending across the interior of the bend region of dimension which will provide the desired spacing for intercommunicating flow to and from both pocket portions of the bladder.

The separator can also be in the form of a longitudinal semi flexible stiff member inside the bladder to impart the general and bent configuration desired, thereby permitting both the underlying and overlying sealed layers of material to be fluid conformable and not requiring, even though preferable, that at least one such layer by stiff or rigid. The fluid conformable portions can thus work in cooperative pushing or pulling relation with each other and the stiff spacing separator member be arranged to provide the movement and functional action of the bladder assembly desired when the bladder is to be inflated or deflated.

In view of the foregoing it is another object of the present invention to provide a bladder structure which can be either inflated or deflated to cause movement of at least one portion thereof which can be matched to the opening in a fluid flow passageway for control of the quantity of fluid flowing through the passageway. In this regard the bladder functions as a damper in a fluid flow system such as in heating and air conditioning systems including domestic, commercial and industrial heating and cooling air ventilating systems as well as automotive and other transportation heating and cooling air conditioning systems.

Another object of the invention is to provide a bladder operable as a damper for fluid flow systems adaptable to match any of the wide range of cross-sectional shapes of the flow channels within which it is to be installed.

A feature of the invention is its capability of providing a bladder operable as a damper or shut off gate for fluid flow systems adaptable to match any of a wide range of cross-sectional shapes and sizes of flow paths within which it is to be installed. In this regard the bladder assembly can be constructed to permit it to be trimmed closely to match the dimensions of the passageways into which it is to be installed. The bladder can be shaped for example for square, rectangular, triangular, round, elliptically and other shaped passageways.

Other objects and features which are believed to be characteristic of my invention are set forth with particularity in the appended claims. My invention, however, both in organization and manner of construction, together with further objects and features thereof, may be best understood with reference to the following description taken in connection with the accompanying drawings.

DETAILED DESCRIPTION OF INVENTION

Figure 1:
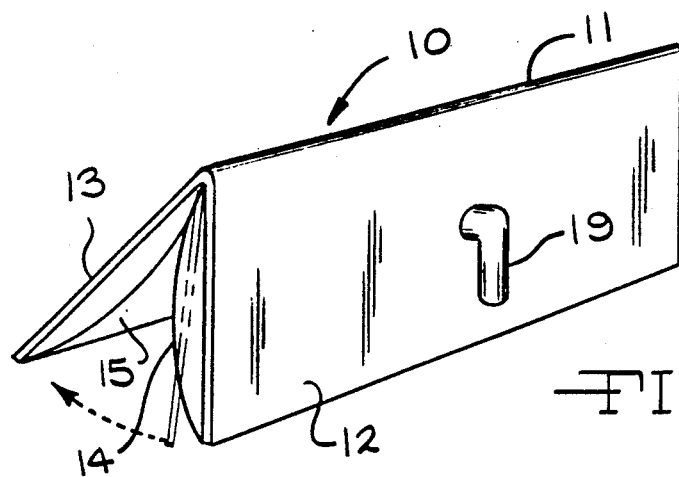
FIG. 1 is a perspective end view of the inflatable bladder of the present invention with a bent shape set to permit movement of one portion arcuately about the bend relative to the other portion which can be arranged to act as a base.

Referring to the drawings in greater detail, FIG. 1 shows an embodiment of the invention in which the bladder assembly 10 is bent or folded over in a region between two edges resulting in a hinge 11, one side providing a base 12 on which a pressure connection 19 is mounted for supply of inflating fluid such as air to the bladder. The base portion 12 is usually fixed in position while the opposite blade portion 13 of the bladder assembly is arcuately movable about the hinge 11. The bladder in its normal shape shown in dashed lines for blade 13 is fixed or set with a narrow angular relationship between the base 12 and the movable blade 13 and is expandable to the position shown in solid lines in FIG. 1, effected by inflation of pockets 14 and 15 associated with the base 12 and the movable blade portion 13 respectively. That is, the bladder is imparted a fixed normal shape such as by heat setting or adhesively setting the assembly at the hinge 11 or by providing an internal separating member of the desired shape. Movement of the blade 13 to increase the angle with the base 12 occurs upon expansion of the bladder. This results in the conformable layer 17 of the bladder forming pockets 14 and 15 which oppose each other to exert a force on the movable blade 13 to the extent desired within the range of movement for which it is designed.

Figure 2:
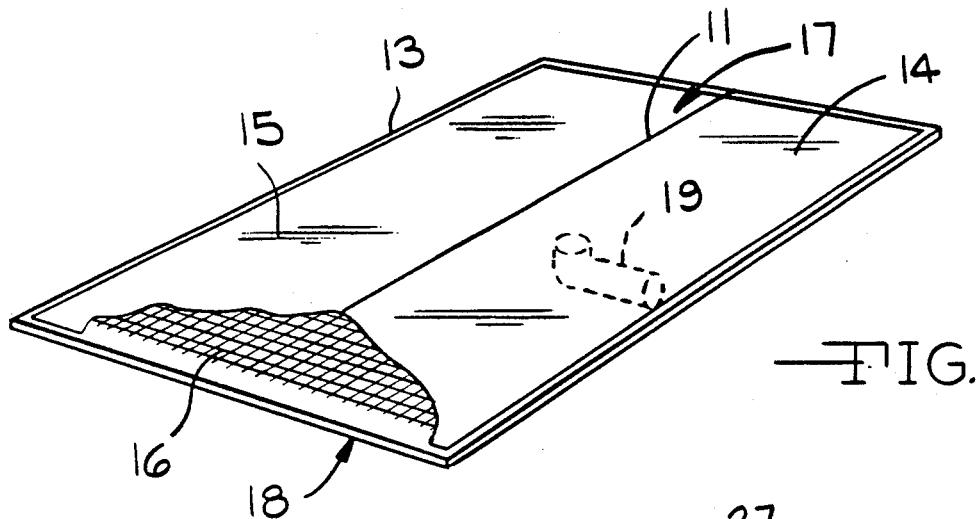
FIG. 2 is a perspective view of a bladder assembly of FIG. 1 shown in flat condition with the hinge or fold region extending between two edges and a porous spacer or separator in the form of screening material extending across the hinge region.

FIG. 2 shows the bladder assembly of FIG. 1 in a flattened unbent condition. The overlying fluid impermeable conformable layer 17 is sealed at the edges of the bladder to the semi-rigid base layer 18 such as by heat or adhesive sealing thus providing pocket portions 14 and 15 associated with base portion 12 and movable blade 13 located on opposite sides of the hinge region 11. A broken away portion in the overlying conformable layer 17 shows a separator material in the form of a layer of screen material 16 or other porous material which extends through the interior of the bladder assembly, especially across the hinge region 11, to maintain a space between the layers 17 and 18. This assures that the inflation fluid supplied to the bladder can flow through and expand the pockets 14 and 15 without a pinching restriction at the hinge region, both in normal and expanded positions of the bladder.

Figure 3:
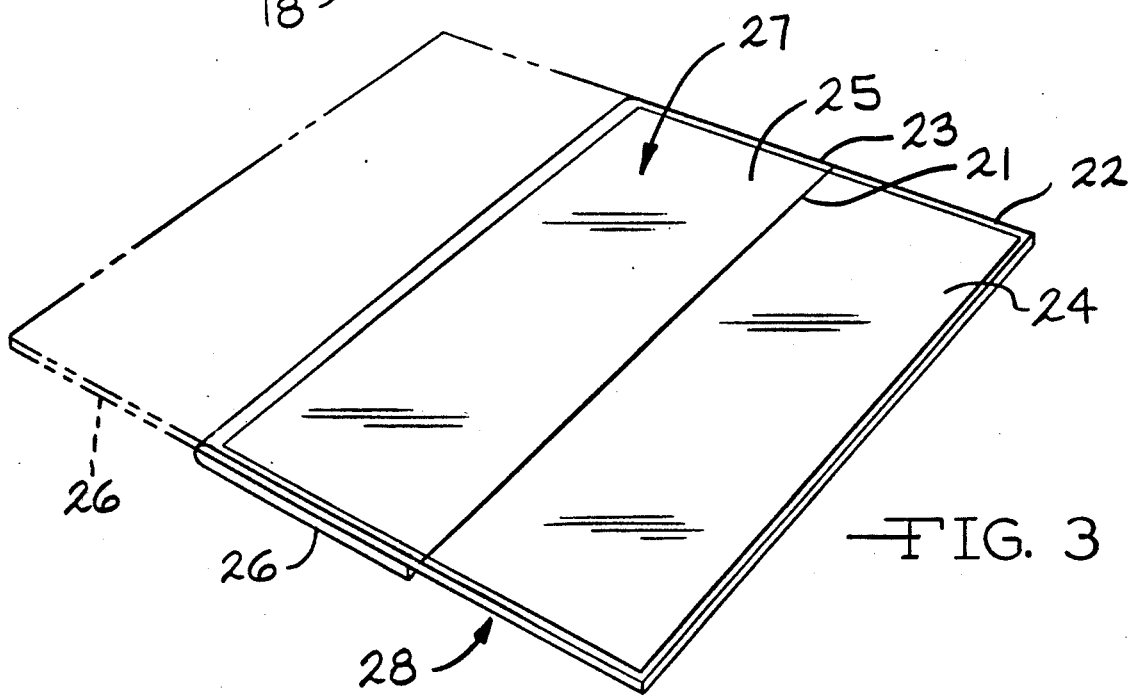
FIG. 3 is a perspective view of another bladder assembly of the invention with a base layer extension which can be folded over to provide a greater blade thickness to impart greater stiffness to the moveable portion of the assembly on one side of the hinge region.

FIG. 3 shows another form of the invention similar to that of FIG. 2 but with the stiffer underlayer 28 having an extension 26 of the assembly extending beyond the bladder region and arranged to be folded over for secured association with the blade portion underlying the bladder portion 25 to provide a thicker and stiffer blade construction. The extension 26 in its flat unbent condition is shown in dashed lines while solid lines show it in its folded over position as it appears in backup association with the blade portion 23 to which it is affixed such by adhesives or mechanical securement. The fluid conformable overlayer 27 provides pocket regions 24 and 25 on opposite sides of the hinge region 21 in sealed relation with the base layer 28 prior to the assembly being set with an angular relationship between the base and blade portions 22 and 23.

An interior separating or spacing means is provided between the stiff material layer and the fluid conformable overlayer where pinching at the hinge region can occur such as is in the arrangement illustrated in FIG. 2. The separating means can be in any of a number of forms such as the screening material 16 shown in FIG. 2 or interior embossments or ridges between the conformable overlayer and the stiffer layer to which it is sealed. Still further the separating means can be in the form of a semi stiff layer providing the angular bent form desired while the over and under layers are fluid conformable without memory.

Figure 4:
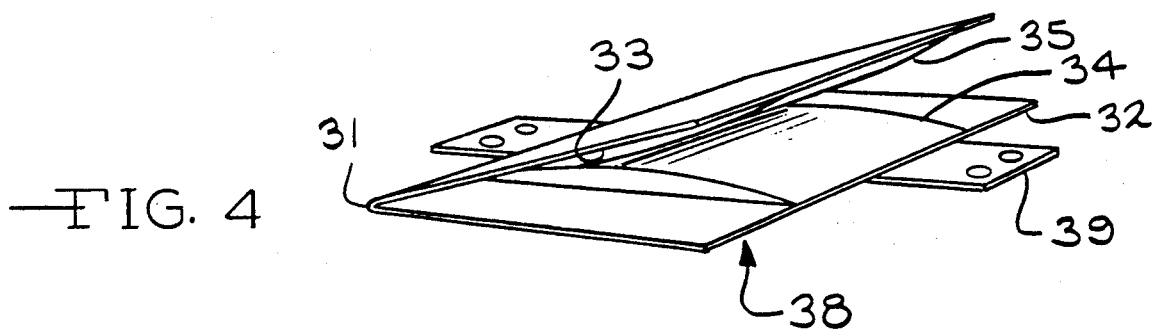
FIG. 4 is another showing of a bladder of the present invention in which the pocket portions of the fluid conformable layer on both sides of the hinge region are narrower than the full width dimension of the base layer and in which a mounting bracket can be fixedly associated with the base layer to facilitate secured mounting of the assembly in a fluid passageway.

FIG. 4 shows the bladder assembly like that shown in FIG. 3 with a set normal acute angular relationship between the base portion 32 and the blade 33 on opposite sides of the hinge portion 31. The difference of the assembly in this showing over those in FIGS. 1-3 is that the bladder is illustrated as being capable of being narrower than the full dimension of the base layer 32 and the blade portion 33. That is, the fluid conformable pocket portions 34 and 35 of the bladder assembly can be of lesser width dimension than both the stiffer base and blade portions and can still function to cause the blade portion 33 to be moved against a biasing action of the base from a small acute angle shown in FIG. 4 to the extent desired as determined by the degree of inflation of the bladder to expand the pockets 34, 35 shown in FIG. 5.

Figure 5:
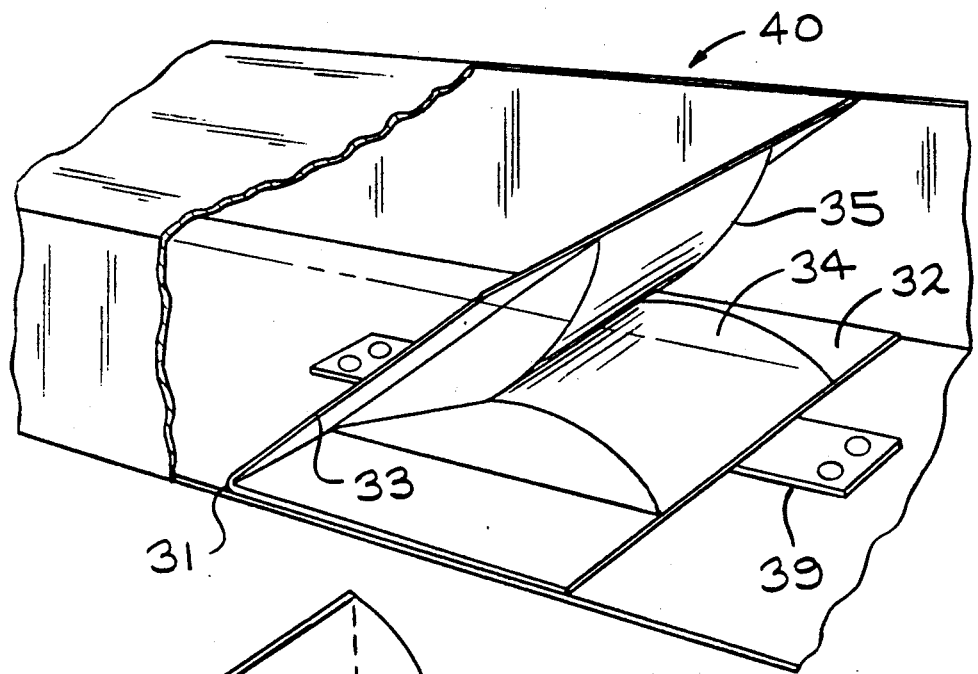
FIG. 5 is a perspective view of the bladder assembly of FIG. 4 shown in a mounted position within a passageway and further showing the assembly in inflated form in which it fully closes the passageway against flow of fluid therethrough.

A bracket, such as a metal or rigid plastic bracket member 39, is provided with screw or rivet openings at each end to enable mounting of the bracket at both ends to a wall of the passageway in which the bladder assembly is to operate. With this arrangement, in which the base 32 and the blade 33 extend beyond the dimensions of the bladder, the assembly can be trimmed to any of a number of sizes matched to, or greater than the dimensions of the pocket regions 34, 35 of the bladder. That is, the assembly can be trimmed to a size of a passageway in which it is installed as shown in FIG. 5.

Figure 6:
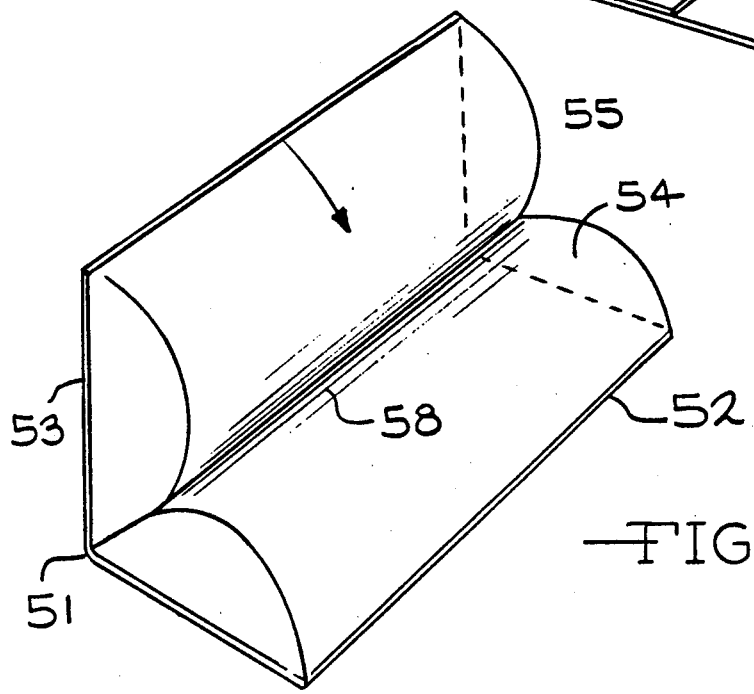
FIG. 6 is a perspective view of another form of the invention in which the base of the bladder assembly is set in a right angular shape and in which upon evacuation, slack of the fluid conformable layer is taken up in the hinge region of the assembly.

Another embodiment of the invention as shown in FIG. 6 is designed more specifically for operation by evacuation of the bladder. The right angular relation between the blade 53 and the base 54 is established by a permanent set in the underlying semi flexible layer forming the blade 53 and the base 54. The blade 53 is moved toward the base 52 about the hinge region 51 by connecting the bladder to a negative pressure source which removes fluid from both pockets 54 and 55 of the assembly. In and upon evacuation of fluid from the pockets 54 and 55 the blade 53 is drawn toward the base 52. To assure uniformity of withdrawal of inflating fluid from both pockets 54 and 55 and exertion of uniform forces to bring the two members of the assembly into closer angular relationship, a partition or tuck region 58 is provided in the conformable layer parallel to the hinge region 51 in which the expansion pockets 54 and 55 are secured together such as by an adhesive to take up slack holding the blade 53 in its normal angular relation with the base 52. The tuck region 58 assists in defining the division between pockets 54 and 55 and is responsible for the action in drawing in the pockets 54 and 55 uniformly when the blade 53 is drawn toward the base 52 when the bladder is connected to a negative pressure source.

Figure 7:
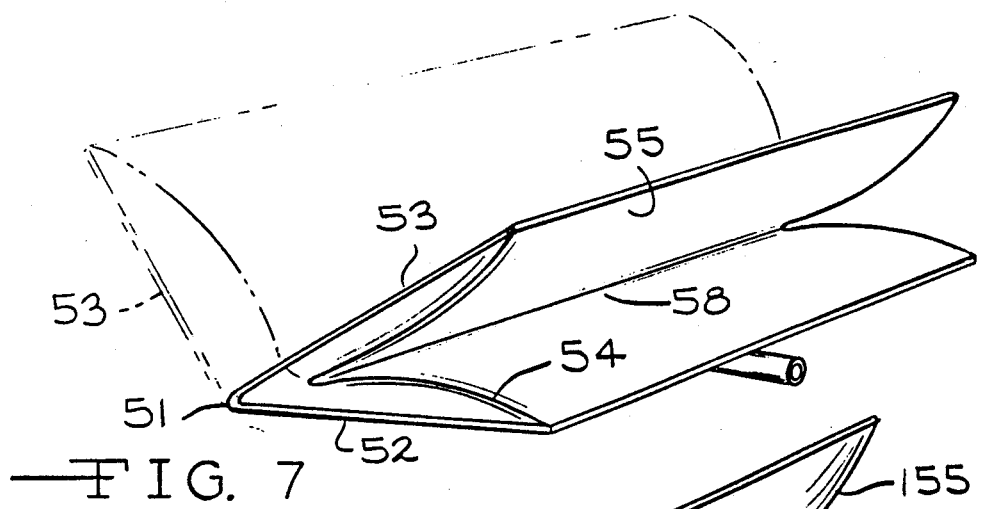
FIG. 7 is a perspective view of the bladder assembly of FIG. 6 showing the contracted angular shape as it appears upon evacuating a portion of the fluid from the interior of the bladder when connected to a negative pressure source.

FIG. 7 shows the bladder assembly of FIG. 6 in a condition in which the fluid is removed from the pockets 54 and 55, thereby establishing an acute angular relationship between the blade 53 and base 52 wherein the tuck region 58 is drawn between the two pockets as illustrated by the dashed line reference 58.

The angle of the assembly of FIG. 7 can also be expanded by supply of pressurized fluid to expand the pockets 54 and 55 to form a obtuse angular relationship between the blade 53 and base 52 about the hinge region 51 of the assembly as shown in dashed lines in FIG. 7. In other words the bladder assembly of FIG. 6 in which a normal relationship of 90 degrees exists between the blade 53 and base 52 can be reduced to a smaller acute angular shape by evacuation of fluid from the interior of the bladder and alternately the bladder can be expanded to an obtuse angular relation between the blade 53 and base 52 by supply of expanding fluid under pressure to the bladder. Thus the bladder assembly of the invention has a wide range of angular orientation capabilities for use in fluid flow systems.

A pump 150, such as a vibrating reed-type air pump, can be used to selectively inflate or deflate the bladder. The pump can be energized by plugging into a commercial power source by way of a power cord 151. The pneumatic supply tube 157 connected to the bladder supplies a positive or negative air pressure to the bladder through a selection valve 152 which can be electrically, pneumatically or mechanically actuated as well as automatically to provide the supply desired. This is accomplished through pneumatic branch connections 161 and 162 to the supply tube 157 from the positive pressure or negative pressure supply sides of the pump as determined by the setting of the valve 152.

Figure 8:
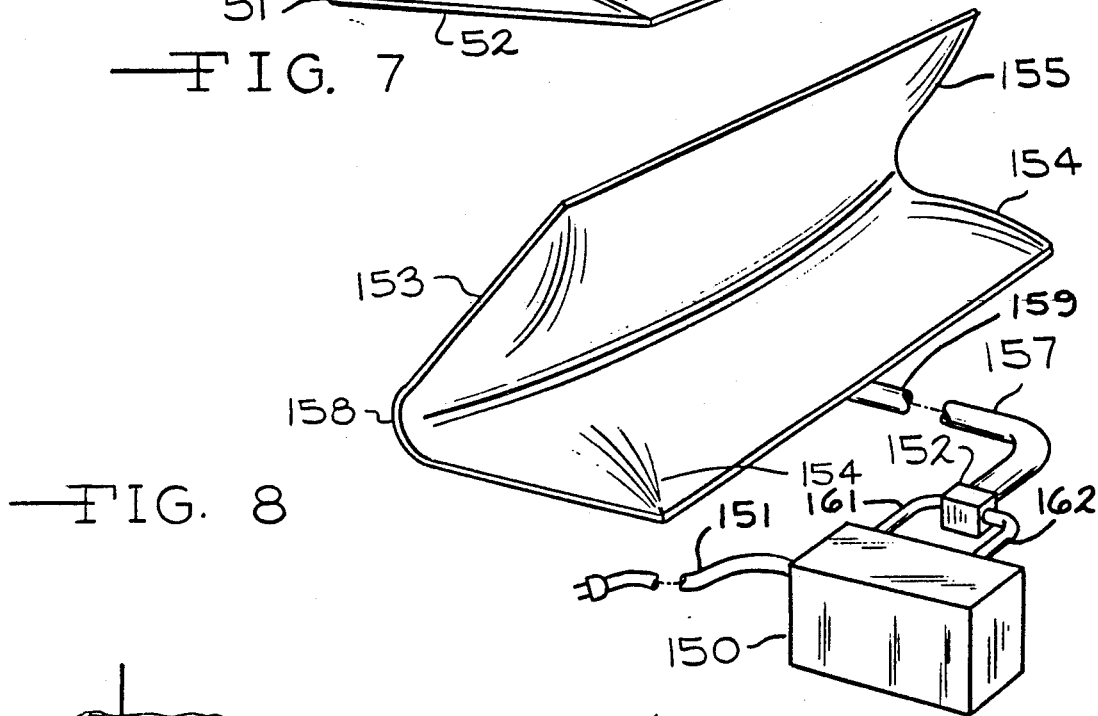
FIG. 8 is a perspective view of another bladder assembly of the invention wherein the fluid conformable layer is of dimension such that the normal bent shape in the semi-flexible underlayer is established by the biasing pull of the overlayer thereon.

In another arrangement of the invention illustrated in FIG. 8, the semi flexible base layer 153 rather than set in an angular form, is bent about its mid region 158 by being pulled or biased into its bent configuration by making the fluid conformable overlayer 154 shorter than the base layer 153 in the region between the sealed edges of the bladder assembly. In this arrangement the angular shape is imparted to the base by the foreshortened biasing action of overlayer 154 and spacing is inherently present between the base and overlayer without need for a spacing means there between. Upon inflation, the assembly can be straightened slightly to a slightly larger angular degree but can be contracted to a larger extent to fold it into a more flattened smaller angular condition by connecting it to a negative pressure source at a fluid connection 159. Thus when one side of the base is mounted in a fixed position in a passage in which flow of fluid is to be controlled, the other side is free to be selectively moved upon inflation or deflation of the assembly to exercise the control of fluid flow desired.

Figure 9:
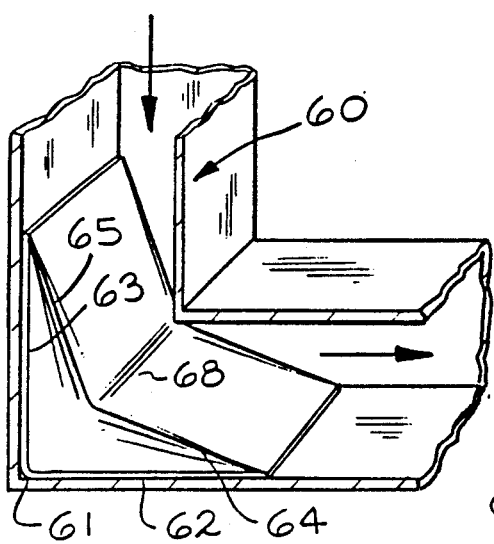
FIG. 9 is a perspective showing partially in cross-section of the bladder of FIG. 6 in a corner position of a right angular bend in a fluid flow passageway.
Figure 10:
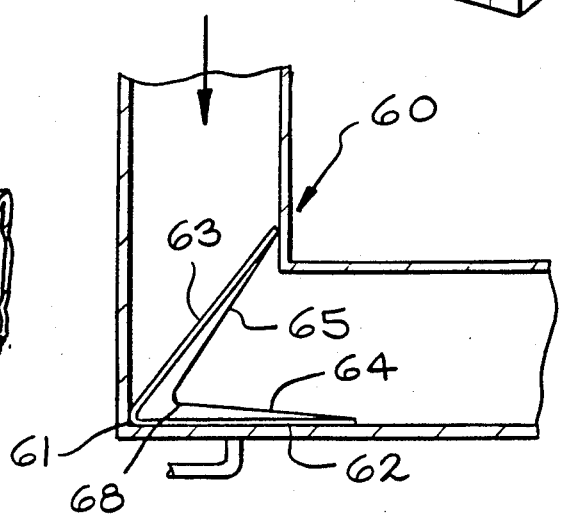
FIG. 10 is a cross-sectional side elevational view of the right angular passageway of FIG. 9 with the bladder of FIG. 6 having internal fluid reduced in volume by connection to a negative pressure source and thereby to close the passageway against flow of fluid therethrough.

FIG. 9 illustrates a system arrangement wherein a bladder assembly, like that shown in FIGS. 4 or 6, is mounted in a right angular flow passageway. The right angular configurated bladder assembly is mounted in a corner of the right angular passageway with the moveable blade portion 63 against the vertical wall of the passageway and the base portion 62 at the horizontal bottom portion of the passageway. The bladder pocket portions 65 and 64 respectively have the slack therein drawn and secured in the tuck region 68 which is parallel to the hinge region 61. Upon withdrawal of fluid from the bladder pockets 64 and 65 the blade 63 is drawn toward base 62 until it hits the opposite wall of the passageway 60 to thereby shut off flow through the passageway as shown in FIG. 10. If desired the blade 63 alternately can be drawn to a partially closed position to reduce the flow through the passageway 60.

Figure 11:
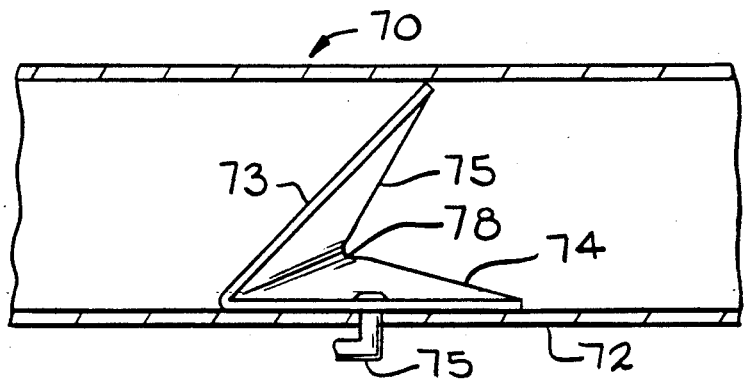
FIG. 11 is the side elevational view in cross-section of a straight-line passageway in which a bladder of the type illustrated in FIG. 6 is mounted in closed position to block the flow of fluid therethrough.

Another application of the invention similar to FIG. 6 is illustrated in FIG. 11 in which the bladder assembly is positioned within a straight run of a duct 70 wherein the normal angular relation between the blade or gate 73 is such as to close off the duct against flow therethrough. The assembly is provided a connection 75 by which a negative pressure can be applied to the assembly to withdraw fluid from the pocket portions 74 and 75 to bring the blade 73 closer to the base 72 to effect an opening of the passageway the number of degrees desired.

Figure 12:
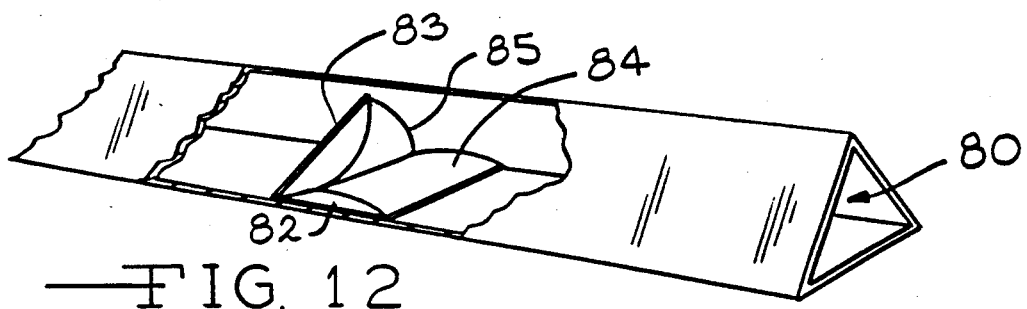
FIG. 12 is a perspective view partially in broken away cross-section of a triangular fluid flow passageway in which a bladder assembly of the present invention is provided with a triangular shaped blade arranged for functional association as a damper in the passageway.

As a representation of the different shaped bladder dampers which can be provided by the invention, a triangular duct system is shown in FIG. 12 wherein the bladder assembly is provided with a triangular shaped blade 83 matched to the triangular cross sectional shape of the passageway 80. The assembly as shown closed in the passageway is arranged to be opened by drawing the blade 83 into a closer or smaller angular relation with the base 82 upon deflation of fluid from the associated pockets 85 and 84. Alternately the assembly can be set in a normally open position by having a normally small angular relation between the blade 83 and the base 82. The system can then effect a closure of the passageway by supply of fluid thereto under positive pressure: A wide range of adaptability of the invention is thus possible particularly because of its possible use with either positive or negative pressure systems, both interchangeably or in association with each other.

Figure 13:
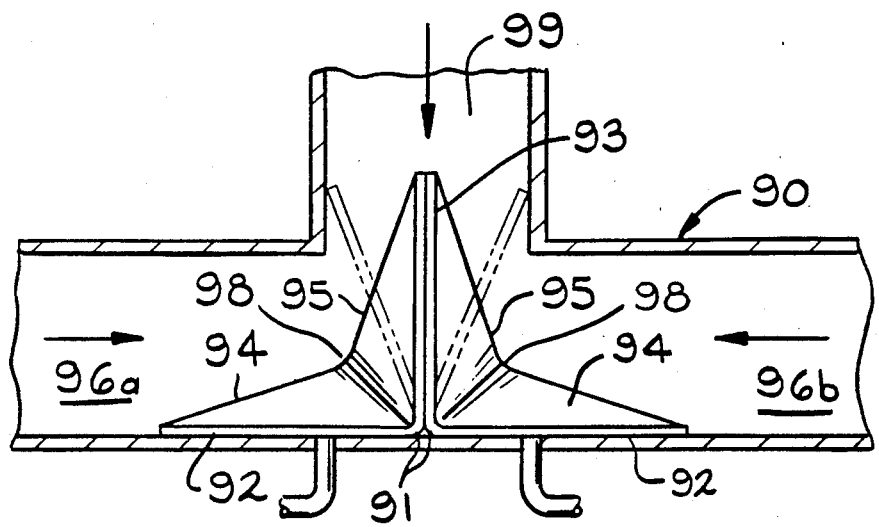
FIG. 13 is a side elevational view in cross-section illustrating how two back-to-back bladder assemblies of the type shown in FIG. 6 can be assembled to control the flow of fluid from two opposing directions leading to a common upwardly directed channel in which either one or both of the opposing side flows can be shut off by withdrawal of control fluid from within the respective bladders.

FIG. 13 illustrates a fluid flow system such as a hot and cold air system in which hot and cold air are supplied from two opposing directions to a common passageway 99. Two bladder assemblies each like that of FIG. 6, are mounted back-to-back between the opposing passageways 96a and 96b mid-region of the common passageway 99 supplied by both. As illustrated in dotted lines the blades 93 of the identical back-to-back assemblies are each movable to close one of the passageways by deflating them such as by applying a negative pressure to their conformable bladder pockets 94 and 95 to bring the blades 93 into a closer angular relation with the base 92 thereby causing each the blades 93 to move in contact with the opposite side wall of the common passageway 99 to effect a closure and shut off fluid flow through the duct system. Either of the bladder assemblies can also be operated independently so as to close off either hot air or cold air if desired thereby making the duct system flexibly useful to a wide range of uses.

As indicated, the bladder assembly of this invention lends itself to a range of adaptations in which by providing a set shape in the base and then stressing the base by deforming it from its normal angular shape, either by inflation or evacuation of the bladder, it can be made to return to its normal set shape by opening the bladder to the atmosphere. That is, the internal stress upon inflation or deflation will cause the bladder to return to its normal angle due to its memory causing it to return to a relaxed state. Thus the bladder assembly can be designed to open or close a passageway by being inflated and in an inverted sense by being deflated upon connection to a negative pressure source.

Further the bladder assembly can be provided an internal self deflating action in the form of a semi flexible internal member having a memory acting to return it a normal angular condition from an inflated or deflated state. That is, the internal member can be designed to impart the shape to the bladder and upon deformation of the member by inflation or negative pressure deflation of the bladder assembly the internal stress of the deformed member can be utilized to return the assembly to its normal angular shape by returning the bladder to atmospheric pressure. In other words it can be made self deflating or self inflating by provision of an appropriate deformable angular member on the interior of the bladder assembly.

Still further the base and gate portions of the assembly need not be connected in a set shape for biasing action at the hinge region but can be connected in a true hinged relationship so that no stress exists between the base and the gate when bending action occurs between them. In other words a true substantially nonstressable hinged relationship can exist. The gate can thus be moved either by inflation or deflation of the associated bladder portions defined by the conformable layer overlying both the base and the gate portions of the assembly. Still further the bladder pockets or portions associated with each might be independent of each other and each individually inflated and deflated as desired to effect the action of the gate of either dampening or regulating the closure or opening of the passageway in which it is installed.

Figure 14:
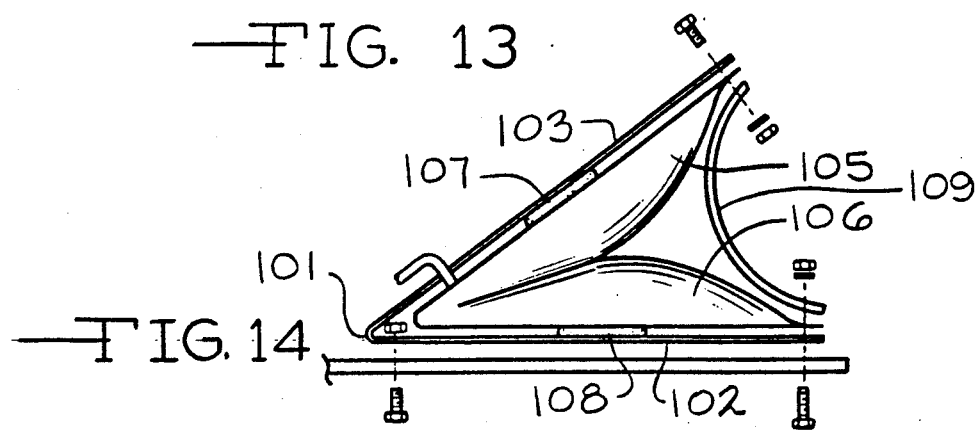
FIG. 14 is a schematic elevational view of another assembly of the invention in which the bladder is inserted in a housing having a gate moveable by expansion and contraction of the bladder.

FIG. 14 illustrates another arrangement of the invention in which the bent bladder forming two pocket portions 105 and 106 is installed in a "V" shaped housing or retainer, one side of which provides a base 102 and the other side of which forms a gate 103. The housing represented can be of semi rigid plastic sheet material or sheet metal which is adaptable to being flexed about the region of joinder at the hinge portion 101, but the angular orientation can be increased by inflation of the bladder which then pushes outwardly within the "V" configuration. To limit the degree of angular expansion of the assembly, a belt or band 109, adjustable in length and made of material such as flexible resin or leather is provided extending between the outer edges of the gate 103 and the base 102. Adjustability in length of the band is made possible by any number of means such as an adjustable clip or prepositioned spaced apertures for engagement by securing members such as rivets or screws. This limits the angle of expansion and movement of the gate 103 to a desired degree and also prevents excessive strain which might otherwise tend to permanently damage the housing and spring action therein. The bladder portions 105 and 106 can be adhesively secured such as with suitable interfacial adhesive 107 and 108 between the bladder pocket 105 and gate 103 and the bladder pocket 106 and the base 102, respectively.

In view of the foregoing, while the invention has been described in relation to the illustrated embodiments, it will be recognized that m' invention is not limited specifically to the particular arrangements shown and described and accordingly by, the appended claims, all modifications, adaptations and arrangements are contemplated which fall within the spirit and scope of the invention.

I claim:

1. A bladder assembly for use in controlling fluid flow in a fluid flow passage, comprising a bladder having a base layer of semi flexible fluid impermeable material,
    an overlayer of fluid impermeable and conformable material sealed at the edges of said bladder to said base layer,
    said bladder having a bending region between two opposite edges which functions as a pivot region about which the portions of said bladder on opposite sides of said bending region can be moved,
    said assembly including means for setting a normal angular relation between said opposite side portions of said bladder,
    means for fixedly mounting said base layer by at least one of said opposite portions of said bladder in said passage whereby the other of said opposite side portions can be moved toward and away from said one portion about said bending region and,
    said other side portion of said bladder comprising flow restricting blade means of size and shaped for restriction of fluid flow through the cross section of said passage,
    connection means associated with said bladder for connecting a pressurized supply of inflating fluid thereto to move said opposite portions further apart and means for deflating said bladder to move said opposite portions closer together whereby the bladder can be arranged to selectively position said blade means for control of flow of fluid in said passage.

2. A bladder assembly as set forth in claim 1 wherein spacer means is provided to maintain a space between said bladder layers when the assembly is in deflated folded condition whereby a fluid passage is maintained between said portion on opposite sides of said bending region.

3. A bladder assembly as set forth in claim 2 wherein said blade means of said opposite portion is of material and dimensions which can be trimmed to size and matched for operation in shape of said passage.

4. A bladder assembly as defined by claim 2 wherein the space between said layers is provided by a flexible spacing member within said bladder extending across said bending region.

5. A bladder assembly as defined by claim 4 wherein said spacing member is a stiff semi flexible member of angular form which sets the normal angular relation between said opposite side portions of said assembly.

6. A bladder assembly as defined by claim 4 wherein said spacing member is of flexible porous material.

7. A bladder assembly as set forth in claim 1 for use as a damper in a fluid flow passage wherein the normal angular relation between said opposite sides of said bladder is imparted by a permanent set in said base layer of said bladder.

8. A bladder assembly as set forth in claim 1 wherein said bladder is divided at said bending region into two bladder pocket regions each associated with separate ones of said opposite side portions of said assembly.

9. A bladder assembly as set forth in claim 1 wherein said blade means of said other of said opposite portions is triangular in shape matched to a passage of triangular cross sectional shape.

10. A fluid expandable bladder as set forth in claim 1, including means for supply of positive pressure to said bladder assembly to expand said bladder.

11. A fluid expandable bladder as defined in claim 10 wherein said means for deflating said bladder comprises means for supply of a negative pressure thereto.

12. A fluid expandable bladder assembly as set forth in claim 11, including means for selectively activating either of said positive pressure means and said negative pressure supply means.

13. A fluid inflatable bladder assembly for use in controlling flow of fluid in a passage of a fluid flow system comprising a bladder,
    a retainer for said bladder, said retainer comprising a base for mounting said assembly in said passage,
    a passage gate member joined at an edge of said base in an acute angular orientation with said base, said gate member being moveable about said edge relative to said base, said bladder being positioned within said retainer between said base and gate member and means for expanding said bladder within said retainer, said bladder being of size to effect movement of said gate member upon expansion when inflated, said bladder being bent about a bending region between two opposite edges thereby forming portions of said bladder on opposite sides of said bending region, one of said bladder portions being positioned adjacent said base member and the other bladder portion being positioned adjacent said gate member whereby upon inflation of said bladder said bladder portions expand in opposed pushing relation with each other to move said gate member.

14. A fluid inflatable bladder assembly as set forth in claim 13 in which said bladder is provided with internal spacing means across said bending region arranged to provide an internal flow passage for an inflating fluid across said bending region during inflation and deflation of said bladder.

15. A fluid inflatable bladder assembly as defined in claim 14 wherein securing means is provided between said gate member and its adjacently positioned bladder portion and between said base member and its adjacently positioned bladder portion to secure said bladder within said retainer.

16. A fluid inflatable bladder assembly as set forth in claim 13 including motion limiting means for limiting the extent of movement of said gate member to that desired upon expansion of said bladder.

17. A fluid expandable bladder for use in controlling flow of fluid in a passage of a fluid flow system within which it is installed comprising an assembly of a base layer of semi flexible fluid impermeable material, and an overlayer of fluid impermeable and fluid conformable material sealed at the edges of said bladder to said base layer, said bladder having a bending region between two opposite edges which functions as a hinge about which the portions of said bladder at opposite sides of said bending region can be moved relative to each other, said fluid conformable overlayer of said bladder being less in dimension across said hinge than said base layer portion of said bladder to draw said assembly to a normal set angular relation between said opposite side portions, for movement of said opposite edges of the bladder toward and away from each other, means for securing the base layer portion of at least one of said side portions in fixed mounted relation in said passage whereby the other of said opposite sides can be moved toward and away from said base portion about said bending region, and means associated with said assembly for supply and removal of inflating fluid from said bladder in selected amounts to move said edges further apart and closer together respectively to thereby open and close said passage to desired degrees.

18. A bladder assembly for use in controlling flow of fluid in a passage of a fluid flow system within which it is installed comprising an assembly of a base layer of semi flexible fluid impermeable material, an overlayer of fluid impermeable and conformable material sealed at the edges of said bladder to said base layer, said assembly having an angular shape formed by providing a bending region between two opposite edges of said base layer which functions as a hinge about which the portions of said assembly at opposite sides of said bending region can be moved, said conformable overlayer extending in biased drawn relation across said bending region between said opposite edges of said base layer to impart said angular shape to said assembly, means for securing the base layer portion of one of said side portions in fixed, mounted relation in said passage whereby the other, of said opposite sides can be moved toward said fixed base portion about said bending region to control the flow of fluid in said passage to desired degrees.

19. A bladder assembly as set forth in claim 18 including means associated with said assembly for removal of inflating fluid from said bladder in selected amounts to move said edges closer together to control the flow of fluid in said passage to desired degrees.

20. A fluid inflatable bladder assembly for controlling flow of fluid in a fluid flow passage comprising a bladder, said bladder being bent about a bending region between two opposite edges which bending region functions as a pivot region about which the portions of said assembly on opposite sides of said bending region can move, means for fixedly securing one of said opposite portions of said bladder as a base in a passage whereby the other of said opposite portions can be moved arcuately toward and away from said one portion about said bending region, said other side portion of said bladder being adaptable to provide a gate means for said passage, means associated with said bladder for supply of inflating fluid thereto and means for deflating said bladder whereby said gate means of said bladder can be moved to open and close said passage to desired amounts.

21. A bladder assembly of size for controlling flow of fluid in a passage of a fluid flow system within which it is installed comprising an assembly of a base layer of semi flexible fluid impermeable material, an overlayer of fluid impermeable and conformable material sealed at the edges of said bladder to said base layer, said assembly having an angular shape with a bending region between two opposite edges of said base layer which functions as a hinge about which the portions of said assembly at opposite sides of said bending region can be moved, said conformable overlayer extending in biased drawn relation across said bending region between said opposite edges of said base layer, and pulling at said base layer in its bent configuration, means for securing said assembly in mounted relation in said passage for movement of at least one of said opposite sides toward the other, and means for removal of fluid from within said bladder in selected amounts to move said edges closer together to control flow of fluid in said passage to desired degrees.

* * * * *